Figure 1:
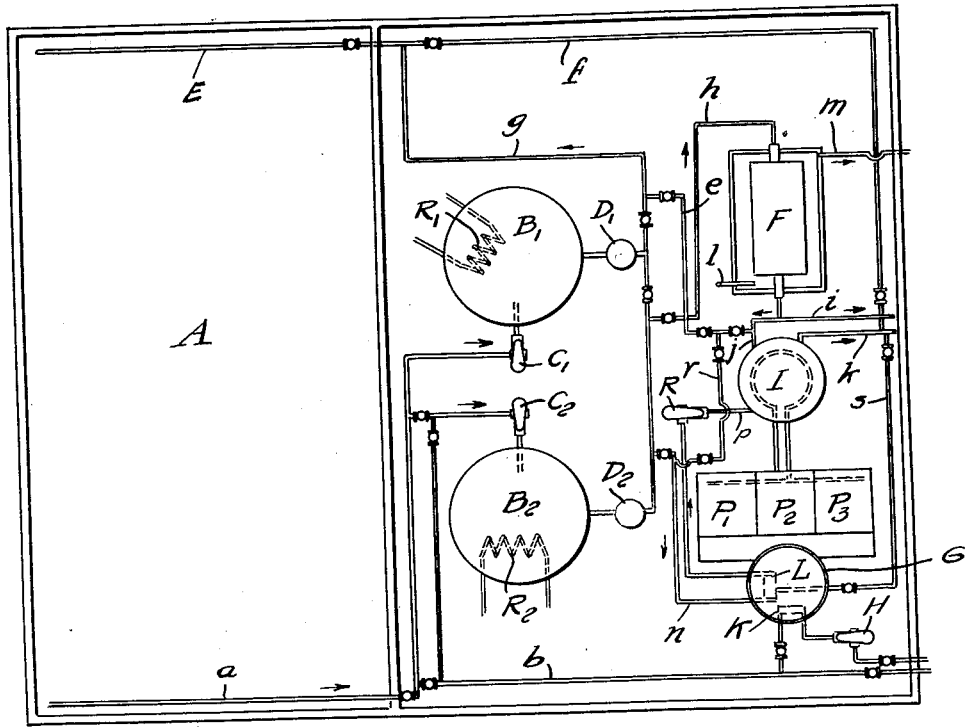

Feb. 20, 1934.  G. O. W. HEIJKENSKJÖLD  1,947,594
BATHING PLANT
Filed Nov. 23, 1928   2 Sheets-Sheet 1

Inventor:
G.O.W. Heijkenskjöld
By Nathaniel Frucht
his Attorney

Feb. 20, 1934.  G. O. W. HEIJKENSKJÖLD  1,947,594
BATHING PLANT
Filed Nov. 23, 1928  2 Sheets-Sheet 2

*Fig. 3*

Inventor:
G.O.W. Heijkenskjöld
By Nathaniel Frucht
his Attorney

Patented Feb. 20, 1934

1,947,594

UNITED STATES PATENT OFFICE 1,947,594

BATHING PLANT

Gustaf Olof Wolfgang Heijkenskjöld, Stockholm, Sweden

Application November 23, 1928, Serial No. 321,338, and in Sweden December 9, 1927

19 Claims. (Cl. 210—11)

The present invention refers to bathing plants and has for its main object to arrange bathing plants in a suitable manner from the point of view of economical operation, and to provide water suitable for bathing purposes by purifying and, if desired, by heating contaminated crude water with the aid of suitable means. The invention also relates to continuous purification of the water in the swimming pond, or to the keeping of such water in a pure state, in order thus to reduce the consumption of water and of heat.

It is required of a good bathing water that it shall be pure and of the proper temperature. A characteristic property of bathing water is that it contains, on having been used, the whole quantity of heat supplied, while being otherwise of the same nature as before, save for the dirt supplied thereto. This also holds true in regard to the water of the swimming pond, and as the contamination of this water is not very great, as a rule, it is preferred to keep the same pure by means of filters, and to sterilize the same, for instance by chlorination, whereby the consumption of water as well as the consumption of heat are reduced to a minimum value. The water intended for tub-baths and shower-baths could be treated in the same manner, but as a rule the costs of purification will be found to be too high in this respect, and this purification also would require too expensive a plant. For this reason, said water is mostly allowed to flow off. In some baths, however, there are apparatus constructed by the inventor and adapted to take care of a great portion of the heat of this water, whereby the heat economy is greatly improved and the load on the boiler plant is reduced, so that about 25% of the boilers may be stopped.

These possibilities for an improved heat and water economy have been prevented to a greater extent, however, by the fact that the mechanical equipment of the bathing plants has not been adapted from the beginning for the utilization of said possibilities, it having been necessary to install a great amount of additional pipings and pumps etc. Also, the bathing plants have not been constructed so that they would permit of a sufficiently easy operation, the interest-bearing capacity of the plants having been impaired by the great expenses for the machine attendants and the maintenance. The proper form of arranging the machine plant in a rational way has not been found hitherto. The present invention has for its object to solve this problem also. By reason of the fact that the consumption of heat has been reduced so very considerably, it has been rendered feasible to pass over from firing with coal as hitherto commonly used to firing with coke or oil, which while being more expensive per se still offers the advantage that the boiler plant is rendered simpler and requires much less work and attendance.

The invention is illustrated more closely in the accompanying drawings showing by way of diagrammatic representation two different bathing plants arranged in accordance with the invention.

Figure 2:
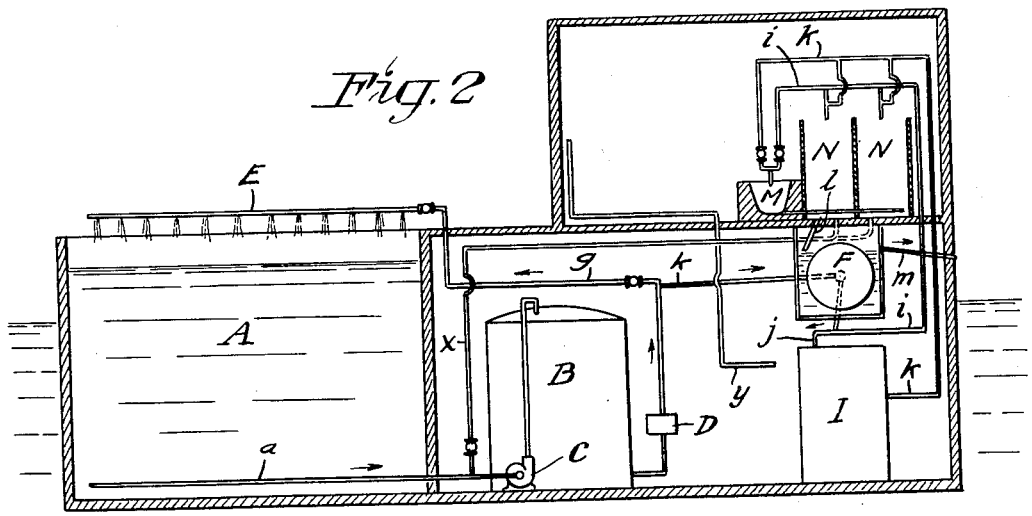

Fig. 1 is a plan view of the swimming pond and the mechanical equipment of a bathing plant according to the invention. Fig. 2 is a section of the same plant, showing also a portion of the superstructure containing tub-baths and shower-baths. Fig. 3 is a diagrammatic plan view of another bathing plant.

The reference characters in the drawings have the following significations:

A is the swimming pond.

B are filters of the quick-filtering type. These filters contain a layer of sand and work in the following manner: The water to be filtered is admixed with a precipitating agent, such as aluminum sulphate, which together with the contaminations of the water cause precipitation on the surface of the sand layer, which prevents the precipitated contamination together with bacteria etc. from passing through the sand layer, an effective purification of the water being thus obtained. The construction of the filters, the precipitating agents and so forth may vary in a number of ways.

C are pumps for the circulation of the water through the filters, for the sucking of water from the pond or from some water course nearby, and so forth.

D are apparatus for the sterilization of the water, for instance by admixing the same with chlorine in some suitable form, or by treating the water with ultra-violet rays or the like.

E is a cascade. The water of the pond taken out at the one end of the pond and then filtered and sterilized, is pumped in through a pipe with fine apertures, so that it will form a cascade so as to be aired.

F is a preheater. This preheater may be constructed in various ways, the same consisting, in principle, of heat exchanging surfaces through which the heat from the used shower-bath and bathing water, for example, is conducted to heat the pure water to be used for the bathing purposes. The best type of such heat-recovering apparatus is Heijkenskjöld's rotating preheater, which is distinguished by the feature that the heat transmitting surfaces form a rotating drum through which the pure water is conducted, and which is submerged in a container passed by the hot bathing water employed. The rotation of the preheater causes the surfaces to be kept constantly clean in spite of the dirty water, and also results in that the transfer of heat is increased about five times. With suitable dimensioning of the preheater, the pure water, as a rule, is preheated in this manner to a temperature of 20–25 degrees centigrade.

G is the chimney for leading off flue gases from the boilers of the plant.

H is a pump for injecting the water into K.

I is a hot water producer. In this apparatus the bathing water is heated by steam from the boilers. This apparatus may be so arranged as to hold a sufficient quantity of water to bring about an equalization between the heating and the consumption of the water.

K is a device for utilizing the heat of the flue gases by causing the same to heat water which is injected in a finely divided state, for instance. This device also has for its object to cause the soot of the flue gases to be deposited, and to clean the flue gases so that they may be carried away without disadvantage. The injected water must be cold to prevent evaporation. In a counter current it may then be heated to a temperature of 60 to 70 degrees centigrade.

L is an economizer for the utilization of the heat of the flue gases by causing them to heat the bathing water. To prevent condensation and contamination of the heat-transmitting surfaces, the water must enter the economizer at a temperature of at least 30 degrees centigrade.

M is a tub with supply cocks for cold and hot water.

N are shower baths with supply cocks for hot and cold water.

P are boilers, such as low pressure boilers fired by coke of the type used for domestic heating systems.

$R_1$, $R_2$ and $R_3$ are heating coils or heating apparatus by means of which the unfiltered water may be heated, for instance by steam, to a temperature suitable for the pond, or by means of which the entering cold water may be heated to temperatures facilitating the precipitation and the filtration in the filter, for instance to 10 to 20 degrees centigrade.

As an example it may be assumed that water from a neighbouring lake or the like is to be used in a bathing plant according to Figs. 1 and 2, and that this water must be filtered to permit of being used. The bathing plant is provided with a swimming pond A, tub-baths M and shower-baths N. The purifying and heating plant for the water comprises two filters $B_1$ and $B_2$, each with a heating apparatus $R_1$ and $R_2$ and each with a pump $C_1$ and $C_2$ and a chlorination apparatus $D_1$ and $D_2$ respectively. The plant further comprises the boiler plant P with the chimney G, a hot water producer I with a hot water reservoir, a water preheater F of the rotary type, for example, an apparatus K for the recovery of smoke heat with a pump H, or an economizer L with a pump R pertaining thereto. The tub-baths and the shower-baths are preferably situated above the machine plant at such an elevation that the water used may flow through the preheater and out without pumping, if the plant is provided in a floating concrete pontoon, for instance. All heating conduits and the heating coils of the hot water producer are at a higher elevation than the boilers, so that a feeding pump is avoided.

During the bathing time this plant operates in the following manner:

The water in the pond is taken off at the bottom at the one end of the pond and is conducted through a pipe $a$ to the pump $C_1$, which forces the water through the filter $B_1$ and the chlorination apparatus $D_1$ and further through a conduit $g$ to a sprinkler pipe E which returns the water into the pond in the form of a cascade.

The water required for shower-baths and tub-baths is sucked in, for instance from a lake or the like, by means of the pump $C_2$, through a conduit $b$, and is forced through the filter $B_2$, in which it is heated, if desired, to about 20 degrees centigrade, after which the water is forced through the chlorination apparatus $D_2$ and the conduit $h$ to the preheater F through the rotating drum of which the water is caused to pass. The hot discharge water coming from tubs and shower-baths in the story above, through the conduit $l$, is caused to flow through the reservoir in which the rotating drum is submerged, this water then giving off its heat onto the water coming from the filter $B_2$. The dirty water cooled down is led off, without pumping, from the preheater reservoir through the conduit $m$. The filtered water is heated either in the filter or during the passage through the preheater F to a temperature of about 20 degrees, and may be conducted through a conduit $e$ into the pond; in part it is permitted to continue, partly through the conduit $i$ to the cold water system to be further conveyed to shower-baths and tubs, and partly through the conduit $j$ to the hot water producer I. In the latter, the water is heated by means of steam to a suitable temperature, for instance 60 degrees centigrade, and on having been accumulated in the hot water reservoir I the water is permitted to continue through conduit $k$ into the hot water system to be further conveyed to the tubs and shower-baths. Here, the cold water of 20 degrees and the hot water of 60 degrees are mixed in the tubs and shower-baths to the desired temperature. From the shower-baths the water consumed may be conveyed through a conduit $x$ to the pipe $a$, and is thus returned to the filter B to be purified. It will be understood that the consumption of hot water will be comparatively small by reason of the relatively high temperature of the cold water. If desired, the pond may also receive hot water through a conduit $f$. To further an economical operation of the boiler plant P, the tub-bath chamber or a Russian steam-bath, as the case may be, may deliver the exhausted warm air, which is preheated therein to a temperature of about 60 degrees centigrade, to the boiler plant P in order to be used in the furnace thereof. The whole of this plant operates automatically. The motors required are only two filter pump motors and the motor for the rotation of the preheater. The work is limited to the filling of the coke receptacles for the steam boilers and to slagging of the boilers, and otherwise involves only little attendance. No continual attendance is required as in case of the common high pressure boilers with their feeding pumps, etc.

This type of plant is particularly serviceable for floating bathing establishments. Obviously, the preheater is not a necessary part of the plant, although it diminishes the size of the boiler plant and also the size of the hot water producer and the hot water container and reduces the fuel consumption. A further saving of fuel is obtained if the incoming crude water is injected by means of the pump H into the flue gases where it is heated before it flows to the filter. However, the efficiency of the preheater F is impaired to a certain extent in the latter case. It is more advantageous, therefore, to cause that portion of the water coming from the filter B₂ which is to be heated to hot water, to pass through the conduit n, either before or after the passage through the preheater F, to any suitable device in the flue gases that will heat the water to 60 or 70 degrees, for example. It is then possible to cause cold water, for instance, to be injected direct from the filter into the flue gases and to be heated in a counter-current to about 60 degrees or more, which may take place without any loss of water through evaporation. In this case, however, a further filter is required to clean the water from soot. This method also entails the advantage that the flue gases are washed and cooled down, so that they may be blown out with the aid of a fan, without the use of a chimney. Even the latent heat of the gases may be utilized in this manner. The water obtained is pumped into the hot water system by means of a pump R through a conduit p.

Another and more simple manner is to cause the preheated water from the preheater F as required for the production of hot water to be conducted with the aid of the pressure from the pump C₂ and over a conduit r, through the flue gases in a common economizer, for instance of the type having ribbed pipes, in which economizer the said water is heated to hot water temperature, after which the water is caused to flow to the hot water system either directly through a conduit s or indirectly through the hot water producer I. This system does not permit of so high a utilization, inasmuch as the flue gases must not be cooled down below 130 to 100 degrees centigrade, in order to avoid condensation and formation of soot on the heat transmitting surfaces of the economizer.

In floating bathing establishments the two filter pumps may be connected so as to permit of being used to empty the pontoon or the pond, and also in such manner that both filters may operate with sea-water when the pond is to be filled. During the periods when no bathing takes place, the two filters may operate with pond water.

Fig. 3 shows a bathing plant with one filter only. This plant comprises a swimming pond A as well as tub baths and shower-baths. The plant for supply of heat and water consists of a filter B₃ provided with a heating apparatus R₃ and with a pump C₃ and a chlorination apparatus D₃, and further comprises a boiler plant P with a chimney G, and a hot water producer I and a preheater F. This plant operates in the following manner:

The water is sucked by means of the pump C₃ from a water course or a lake through a conduit t and the preheater F, and is heated in the latter to about 20 degrees, that is to say approximately to the temperature of the pond water, and then continues to the filter through the conduits u, b and a. At the same time the same pump sucks water from the pond through the conduit a and forces the two different kinds of water through the filter. The filtered and chlorinized water flows in part through the conduit g to the pond and in part through the conduit i to the cold water system, and in part also to the hot water producer I. The whole plant thus operates with a single pump and will be very easily managed.

In this case, too, the preheater is not really necessary, although it involves the same advantages as in the previous example. If the same is dispensed with, the water in the filter will be mixed from cold water and from the water of 20 degrees, from the pond. This mixed water may be heated in the filter, for instance by means of steam in the heating coil R₃, to a temperature of 20 degrees, for example. Alternatively, the water returned to the pond, for instance in the conduit f, may be diluted with hot water, so that the proper temperature is maintained in the pond. In case the consumption of hot water would be so great that the boiler plant cannot deliver the requisite quantity of water, the supply of cold water may be stopped, the water required for the shower-baths and the tubs being then taken from the pond over the filter. The size of the pond with respect to the consumption of water for the shower-baths renders the same very suitable as an accumulator of water of 20 degrees. When the bathing frequency goes down, the pond is filled anew.

As in the plant shown in Figs. 1 and 2, crude water may be injected by means of the pump H into an apparatus K adapted to utilize the heat of the flue gases. The water heated in this manner is cleaned in the filter B₃, and is further distributed to the pond, and to the cold and hot water systems, and so forth. In all cases, either the whole quantity of entering water, or the water intended to be supplied to the hot water system, may be softened, that is to say relieved of lime and rendered soft by being conducted, for instance, through a natrolite-filter of the Elektrolux-type, for example.

What I claim as new and desire to secure by Letters Patent of the United States of America is:—

1. In a floating bathing plant, a bath, a water preheater located below the level of said bath and above that of the surrounding water, a source of water supply for said bath passing through said preheater, means for conducting the discharge water from said bath to said preheater and therefrom to the surrounding water, whereby the discharge water from said bath may flow by gravity through said preheater and out into the surrounding water.

2. In a floating bathing plant comprising a floating pontoon, low pressure boilers located at the bottom of the pontoon, means to heat the bathing plant, a hot water producer, conduits to supply steam from said boilers to said heating means and to said hot water producer, other conduits for conducting condensate from said heating means and said hot water producer to said boilers, the heating means and the hot water producer being situated at so high an elevation relatively to the boilers that the condensate may be returned into the boilers by gravity.

3. In a bathing plant having shower-baths, means for supplying crude water, means for withdrawing water employed in the shower-baths, means for mixing said crude water with said discharge water employed in and withdrawn from the shower-baths in order to utilize the heat of said discharge water and to obtain in the water mixture a sufficiently high temperature for filtration, and means for filtering said water mixture.

4. In a bathing plant, a swimming pool, shower-baths, means for supplying crude water, means for withdrawing heated water from said swimming pool, means for withdrawing heated water employed in the shower-baths, means for mixing said crude water with the water withdrawn from said swimming pool and from said shower-baths in order to utilize the heat of said withdrawn water and to obtain in the water mixture a sufficiently high temperature for filtration, and means for filtering said water mixture.

5. In a floating bathing plant a floating structure divided into two compartments, the one containing a swimming pool of large dimensions, the level of the water therein being higher than the level of the water supporting the floating structure, the other compartment containing the machinery, a deck covering said compartment and shower-baths on said deck, arranged above the level of the surrounding water.

6. In a bathing plant, a swimming pool of heated water, filtering means, and shower-baths, a cold water system for said shower-baths, a hot water system including a hot water producer for said shower-baths, means for supplying water from said swimming pool to said filtering means, and means for conducting the filtered water partly to said swimming pool, partly to the cold water system and partly to the hot water system.

7. In a bathing plant, a swimming pool of heated water, a filter, shower-baths, means to circulate the water from said swimming pool through said filter and back to the pool, a second filter, means for supplying crude water to said second filter, heating means arranged in said second filter, and means for supplying water from said second filter to said shower-baths and to said swimming pool.

8. In a bathing plant, a swimming pool of heated water, a filter, and shower-baths, means to circulate the water from said swimming pool through said filter and back to the pool, a second filter, means for supplying crude water to said second filter, means for supplying water from said swimming pool to said second filter to be mixed with crude water before filtration, and means for supplying water from said second filter to said shower-baths and to said swimming pool.

9. In a bathing plant, shower-baths, a water preheater, means for conducting discharged water from said shower-baths through said preheater to give off heat therein and thence to discharge, filtering means, heating means arranged in said filtering means, means for supplying crude water to said filtering means, and means to conduct the water thus filtered to said preheater and deliver the filtered and preheated water to said shower-baths.

10. In a bathing plant, a swimming pool, shower-baths, means for conducting heated water to said shower-baths, means for withdrawing water from said swimming pool, means for withdrawing water employed in the shower-baths, means for mixing said water withdrawn from said swimming pool with the water employed in the shower-baths, a filter, a heater, means for conducting the water mixture thus obtained to said filter, and means for supplying the filtered water mixture, partly to said swimming pool and partly to said heater.

11. In a bathing plant, a swimming pool of heated water, filtering means, a preheater, shower-baths, a cold water system for the shower-baths, a hot water system including a hot water producer for said shower-baths, means for supplying water from said swimming pool to said filtering means, means for conducting the filtered water partly to the swimming pool, partly to the cold water system and partly to the hot water system, and means for supplying crude water to said preheater and to said filtering means.

12. In bathing plant, shower-baths, a preheater, a filter, and a heater, means for supplying crude water to said preheater and to said filter, means for supplying the filtered water to said heater and to said shower-baths, and means for conducting the discharged water from said shower-baths to said preheater, whereby the discharge water from said shower-baths may flow by gravity through said preheater.

13. In a bathing plant, shower-baths, low pressure boilers, a hot water producer, an economizer, a preheater, a filter, a crude water supply conducting crude water to said preheater, a second crude water supply conducting crude water to said economizer, means for conducting water from said economizer to said preheater, means for conducting water from said preheater to said filter and to said hot water producer, and means for conducting heated water to said shower-baths.

14. A bathing plant, comprising a swimming pool of heated water, shower-baths, a heater, a filter, means for supplying crude water to said filter, means for conducting filtered water from said filter to said heater and to the shower baths, and means for conducting water from said swimming pool to said filter and therefrom to said heater and said shower-baths, in order to secure a sufficiently high temperature of the heated water when the hot water consumption exceeds the normal amount.

15. In a bathing plant according to claim 14, the method of mixing crude water and water from the swimming pool in such a ratio, that the delivery of crude water decreases and the delivery of water from the swimming pool increases, when the consumption of hot water in the shower baths increases, in order to secure a substantially constant temperature of the heated water.

16. In a bathing plant the combination of a swimming pool, filtering means, shower-baths, a hot water system including a hot water producer for said shower-baths, and means for supplying water from said swimming pool through said filtering means and through said hot water producer to said shower-baths.

17. In a bathing plant the combination of a swimming pool, filtering means, shower baths, a hot water system including a hot water producer for said shower baths, means for supplying water from said swimming pool through said filtering means and through said hot water producer to said shower-baths, and means for returning superfluous filtered water, not needed in the shower-baths to said swimming pool.

18. In a bathing plant, the combination of a swimming pool, filtering means, shower-baths, a hot water system including a hot water producer for said shower-baths, means for supplying water from said swimming pool through said filtering means and through said hot water producer to said shower-baths, means for returning superfluous filtered water not needed in the shower-baths to said swimming pool, and means supplying the swimming pool with filtered crude water, corresponding to the water withdrawn.

19. In a bathing plant, a swimming pool of heated water, shower-baths, means for withdrawing water from said swimming pool, means for supplying crude water, means for mixing said crude water with the water withdrawn from said swimming pool, in order to obtain in the water mixture a sufficiently high temperature for filtration, means for filtering said water mixture, and means for conducting the filtered water to said swimming pool and to said shower-baths.

GUSTAF OLOF WOLFGANG
HEIJKENSJÖLD.